March 1, 1960

J. A. N. CLEVERS 2,927,196

METHOD OF FORMING A TUBULAR PROJECTION

Filed July 22, 1958

INVENTOR
JOHANNES ANTHONIUS NICOLAAS CLEVERS

BY

AGENT

United States Patent Office 2,927,196
Patented Mar. 1, 1960

2,927,196

METHOD OF FORMING A TUBULAR PROJECTION

Johannes Anthonius Nicolaas Clevers, Eindhoven, Netherlands, assignor to North American Philips Company, Inc., New York, N.Y., a corporation of Delaware Application July 22, 1958, Serial No. 750,157

Claims priority, application Netherlands August 8, 1957

5 Claims. (Cl. 219—137)

My invention relates to a method of forming a tubular projection on a metal member.

Such a method is important, for example, for manufacturing branch pieces and tubes on or to pipe-lines, boiler fronts, steam drums and the like.

As is well-known, pipe connections on or to pipe lines may be established in different ways. It is possible to use for this purpose T-pieces which are readily available, but such a pipe connection is expensive, because a special T-piece is required, and three circular welds must be provided for each pipe connection. A direct junction of pipe on pipe has the disadvantage of difficult weldability, especially of the first layer. Consequently, this method is seldom used for structures which are heavily loaded.

In some cases one pipe may be connected to a second pipe which has a protruding portion formed by forging. However, this is not only expensive, but has the disadvantage that for low-alloyed steels, such as steels resistant to leakage (for example alloyed with 4–6% of Cr, 0.4–0.7% of Mo and 0.5% of Si) a heating process followed by deformation, such as occurs in forging, may severely damage the steel. A brittle structure may thus result, possibly in combination with little cracks.

Different methods are also used in connecting pipes to boilers or drums. Especially in the case of constructions heavily loaded, establishing such connections requires a high skill of the welder and such connections are comparatively expensive.

An object of the present invention is to provide a simple and effective method of securing an annular projection to a wall.

In accordance with the method of the invention, I arrange upon or adjacent the member on which the tubular projection is to be formed, a jig or encasing member having a bore which is equal to, or slightly larger than, the outer surface of the projection to be formed. One or more electric-arc welding electrodes having slag-forming coatings are then moved in a circular path adjacent the inner surface of the jig, whereby the material of the electrode is melted and built up into the annular projection. The slag collects in the central portion of the bore to form an inner support for the molten welding material. Thus, the slag acts as the inner support for the projection being formed, whereas the jig acts as the outer support.

Especially good results are obtained by using coated welding electrodes of the basic type poor in hydrogen, for example the "Philips" electrodes types 36, 565, 56R, K.V., particularly the "Phillips" electrode type 56R. In such electrodes the weight of the coating is, as a maximum, 35% of the weight of the core. The percentage of calcium fluoride and other fluorides, if any, in the coating plus five times the percentage of $K_2O+Na_2O$ should form at least 40% of the coating. The water content should be 0.20% as a maximum.

Further embodiments of the method according to the invention and important details thereof will now be described more fully, by way of example, with reference to the accompanying drawing, in which Fig. 1 is a perspective view of a pipe having a forged protruding portion;

Figure 1:
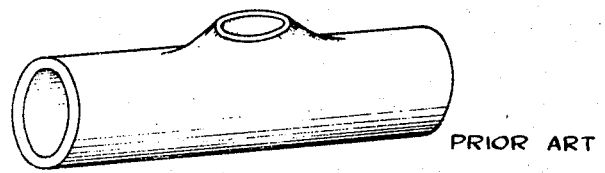

The pipe shown in Fig. 1 is provided with a protruding portion which has been formed by forging and which, as stated above, is a method which is expensive and results in damage to the material.

Figure 2:
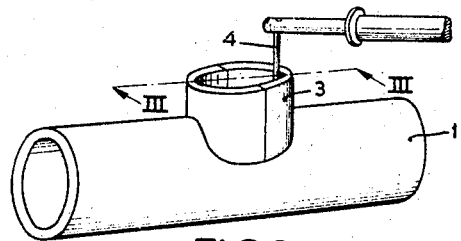
Fig. 2 is a perspective view of a pipe with accessories during the carrying out of the method according to the invention.
Figure 3:
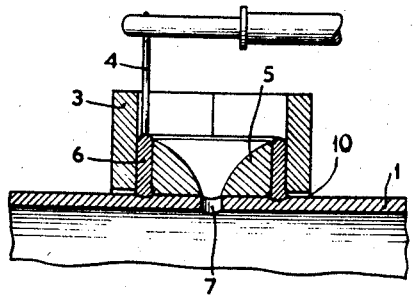
Fig. 3 is a cross-section taken along the line III—III in Fig. 2.

As shown in Figures 2 and 3, a pipe 1 is provided with a tubular jig 3 of a material to which welding metal does not readily adhere, such as copper, carbon or similar materials. The lower part of jig 3 has a shape which conforms to pipe 1 and is made in two pieces to facilitate its removal after the annular projection 6 (see Fig. 3) is formed. To insure satisfactory fusion to pipe 1 it may be advantageous for the jig 3 to be spaced a small distance, for example 1 to 2 mms., from the surface of pipe 1 as shown at 10 in Figure 3.

Certain materials require preheating before they can be electrically welded. In this welding method also the same thermal treatment is used as for such steels in normal electric welding. Use is preferably made of welding electrodes having a coating of the type poor of hydrogen, since such electrodes offer the possibility to weld on the preceding layer without removing the slag already deposited.

In order to form the annular projection, an electrode 4, preferably one of the above-mentioned type, is inserted into the bore of jig 3 and given a circular movement around the inner surface thereof. During the first circular movement the arc is directed toward the pipe 1 and during the subsequent movement it is directed to the welding metal which has already been melted down. As shown in Figure 3, the slag 5 accumulates inside of the jig 3 and serves as an inner support for the annular projection 6 as it is built up from the molten welding metal, whereas the inner surface of jig 3 serves as the outer support for projection 6.

In the above manner it is possible to build up an annular projection on the wall of pipe 1 by the welding metal which is melted down during the welding. If the annular projection 6 has a small diameter, an excessive amount of the slag 5 may accumulate inside of the jig 3 and, to avoid this, I prefer to provide in pipe 1, prior to the welding, a hole 7 which permits the excess slag to escape.

After the welding has been completed the jig 3, as well as the slag 5, deposited inside projection 6, as well as any slag which may be deposited on the outside of the jig, are removed. Subsequently, if desired after a thermal treatment, the hole 7 in the pipe may be enlarged to the inner size of projection 6, and the upper edge of the ring may be submitted to the required pre-treatment.

The above-described method is also suitable for use with welding wire which is supplied continuously, in which case I prefer to use wire provided with a basic slag.

Figure 4:
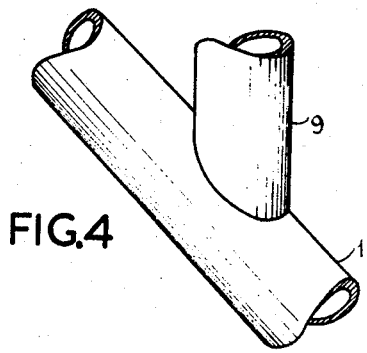
Fig. 4 is a perspective view of a pipe with a projection formed thereon by the method of the invention.

Figure 4 shows a pipe 1 on which an annular projection 9 has been formed at an acute angle by the method of the invention while using a jig similar to jig 3, but shaped so as to conform to the angularity of the connection.

While I have described my invention in connection with specific examples, I do not desire to be limited thereto as obvious modifications will be readily apparent to one skilled in this art. For instance while the tubular projection has been shown of cylindrical shape other shapes may be used in my method, for example it may be of conical shape, or have an oval or multi-angular cross-section.

What is claimed is:

1. A method of forming a tubular projection on a metal member by welding with an electrode having a core coated with slag-forming material, comprising the steps of arranging on the member a tubular jig having an inner surface corresponding in shape to the outer surface of the tubular projection to be formed, and moving the electrode around the inner surface of the jig while melting down the core to build up the projection and forming from the slag an inner support having an outer surface corresponding to the inner surface of the projection.

2. A method of forming an annular projection on a metal pipe by welding with an electrode having a core coated with a slag-forming material, comprising the steps of arranging on the pipe an annular jig having an inner cylindrical surface corresponding to the outer cylindrical surface of the annular projection to be formed, and moving the electrode around the inner surface of the jig while melting down the core to build up the projection and forming from the slag an inner support having an outer cylindrical surface corresponding to the inner cylindrical surface of the projection.

3. A method of forming a tubular projection on a metal member having a slag-discharge hole by welding with an electrode having a core coated with slag-forming material, comprising the steps of arranging on the member and around said hole a tubular jig having an inner surface corresponding in shape to the outer surface of the tubular projection to be formed, moving the electrode around the inner surface of the jig while melting down the core to build up the projection, and forming from the slag an inner support having an outer surface corresponding to the inner surface of the projection while discharging the excess slag through said hole.

4. A method of forming a tubular projection on a metal member by welding with an electrode of the hydrogen-poor type and having a core coated with slag-forming material, comprising the steps of arranging on the member a tubular jig having an inner surface corresponding to the outer surface of the tubular projection to be formed, and moving the electrode around the inner surface of the jig while melting down the core to build up the projection and forming from the slag an inner support having an outer surface corresponding in shape to the inner surface of the projection.

5. A method of forming a tubular projection on a metal member having a slag-discharge hole by welding with an electrode having a core coated with slag-forming material, comprising the steps of arranging on the member an around said hole a tubular jig having an inner surface corresponding to the outer surface of the tubular projection to be formed, moving the electrode around the inner surface of the jig while melting down the core to build up the projection and at the same time building up from the slag an inner support having an outer surface corresponding to the inner surface of the projection, removing the jig, and removing the slag from the hole and the space within the projection.

References Cited in the file of this patent

UNITED STATES PATENTS

| | | |
|---|---|---|
| 1,160,428 | Markley | Mar. 16, 1915 |
| 1,545,131 | Dillon et al. | July 7, 1925 |
| 1,807,477 | Hume | May 26, 1931 |
| 2,015,246 | Taylor | Sept. 24, 1935 |
| 2,262,212 | Stone | Nov. 11, 1941 |
| 2,824,952 | Zoethout | Feb. 25, 1958 |